E. A. JERN.
TRANSMISSION FOR MOTOR DRIVEN VEHICLES.
APPLICATION FILED DEC. 22, 1916.
1,238,778.
Patented Sept. 4, 1917.
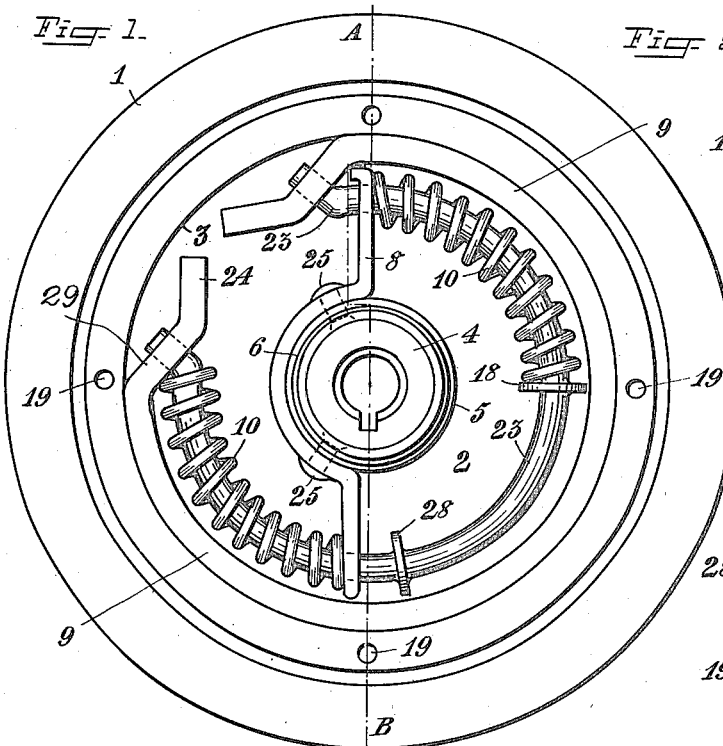
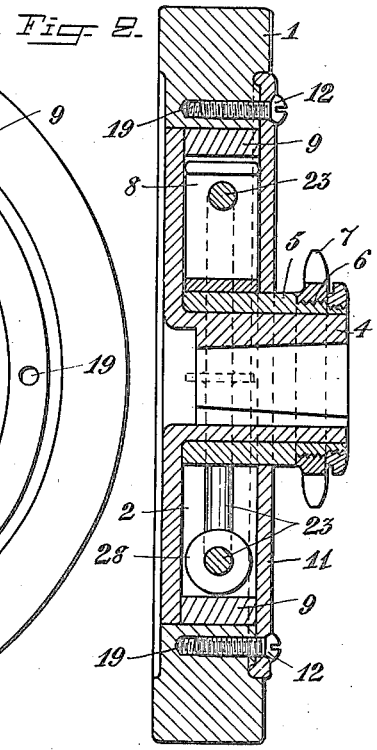
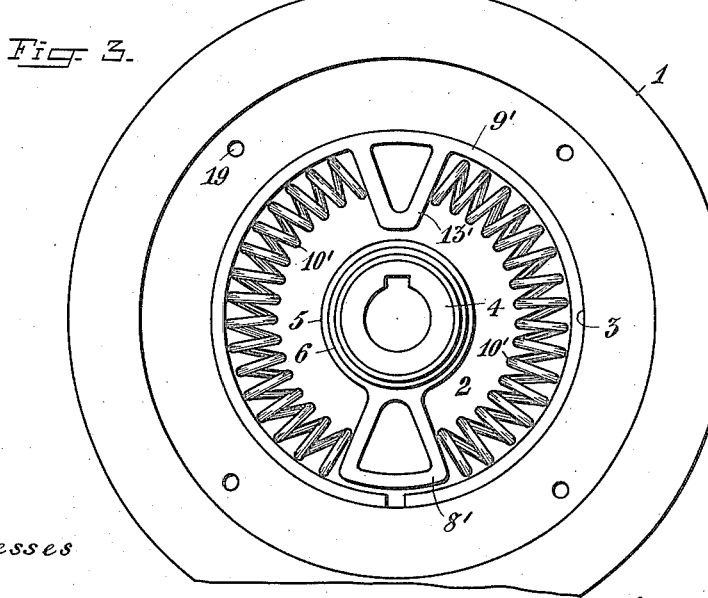
Witnesses
Inventor
Emil Alfred Jern,
By B. Singer,
Attorney

UNITED STATES PATENT OFFICE.

EMIL ALFRED JERN, OF GEFLE, SWEDEN, ASSIGNOR TO PER HOLMSTRAND, OF GEFLE, SWEDEN.

TRANSMISSION FOR MOTOR-DRIVEN VEHICLES.

1,238,778.   Specification of Letters Patent.   Patented Sept. 4, 1917.

Application filed December 22, 1916. Serial No. 138,463.

*To all whom it may concern:*

Be it known that I, EMIL ALFRED JERN, subject of the King of Sweden, residing at Gefle, Sweden, have invented certain new and useful Improvements in Transmissions for Motor-Driven Vehicles, of which the following is a specification.

The present invention relates to transmissions for motor driven vehicles, especially to chain transmissions, in which the one sprocket wheel is mounted on the shaft of a rotating wheel or disk of the motor in such a way that the said sprocket wheel can have a rotary movement in relation to said disk.

According to this invention there is arranged a spring member in the said wheel or disk, said member, on account of its tension, being caused to rotate with the disk by friction and being further by means of a yielding clutch connected to the sprocket wheel.

The invention is shown in the accompanying drawings.

Figure 1 is a side view of the clutch with the cover omitted.

Fig. 2 is a section on the line A—B in Fig. 1.

Fig. 3 is another embodiment of the clutch.

The fly wheel 1 is provided with an annular recess 2, which extends from the wall or edge 3 to the hollow shaft 4 of the fly wheel. On this shaft there is mounted a sleeve 5, which is provided with screw threads 6 for receiving the chain wheel 7.

In order to obtain a yielding connection between the chain wheel and the driving organ (the fly wheel) there is placed within the recess 2 of the fly wheel a circular spring-member 9 with free ends. This spring member abuts with its whole outer periphery against the wall 3 of the recess.

Through holes at the ends of the spring member the ends of an annular rod 23 are passed. Said rod preferably tends to spring outwardly so as to increase the strain or tension in the member 9. The rod 23 serves as a guide for two coil springs 10. On the sleeve 5, which carries the sprocket wheel 7, there is attached by means of rivets 25 a member 8, having two arms adapted to form an abutting shoulder for the one end of the coil springs 10. The other end of the one coil spring abuts against the bent end 29 of the spring member 9, while that end of the other coil spring 10, which is remote from the member 8 abuts against a shoulder 18 on the rod 23.

According to the embodiment shown in Fig. 3 the spring member 9' is provided— opposite to its free ends—with a shoulder 13', between which and a similar shoulder 8', carried by the sprocket wheel sleeve and lying in flush with the member 9', the two coil springs 10' are inserted.

The coil springs 10' are here guided partly by the spring member 9', partly by the bottom of the recess 2 and partly by the cover 11, which is secured in position by means of the screw bolts 12. Such a cover is also used in the embodiment shown in Figs. 1 and 2.

The holes for the screw bolts 12 are indicated at 19 in Figs. 1 and 2. The cover serves also to secure the sleeve 5 for the sprocket wheel in position.

It will be seen that the yielding coupling or clutch described may be arranged on the sprocket wheel of the front wheel shaft or on that of the rear wheel shaft. It is only essential, that it is arranged between the chain transmission on the one side and the driven or driving member on the other side.

Obviously the yielding devices may also be arranged in a different way.

Through the device shown the sprocket wheel is actuated from the fly wheel in a yielding way. On starting the motor before the machine has begun to operate the spring member 9, at the first explosions of the motor, slides against the surface 3 of the fly wheel, whereby the front fork of the vehicle is prevented from being deformed and the chain from bursting.

The spring member 9 thus acts as a safety-coupling between the fly wheel and the sprocket wheel.

The spring member also has such a sliding movement, when counter ignitions arise.

The coil springs 10 have for their object to compensate the influence of the explosives upon the chain transmission after the starting of the machine.

Claims:

1. A resilient transmission comprising in combination a driving wheel having an interior cylindrical surface, a spring member frictionally engaging said cylindrical surface, a driven member coaxial with said wheel, and a resilient coupling between said spring member and said driven member.

2. A resilient transmission comprising in combination a driving wheel having a hub and an interior cylindrical surface, a spring member frictionally engaging said cylindrical surface, a driven member coaxial with said wheel and mounted on said hub, and a resilient coupling between said spring member and said driven member.

3. A resilient transmission comprising in combination a driving wheel having a hub and an interior cylindrical surface, a spring member frictionally engaging said cylindrical surface, a driven member coaxial with said wheel and mounted on said hub, and a resilient coupling between said spring member and said driven member, said resilient coupling comprising a curved rod connected to the ends of said spring members, coiled springs mounted on said rod, and shoulders fixed to such driven member against which said springs thrust to transmit the motion of said driving member to said driven member.

4. In transmitting devices for motor driven vehicles the combination of a driving wheel rotated positively from the motor, a driven member loosely mounted on the shaft of said wheel and forming a part of the device for transmitting movement from the said wheel to one of the vehicle wheels, a spring member held by its tension into frictional engagement with the said driving wheel, and a yielding coupling between said spring member and the said driven member.

5. In transmitting devices for motor driven vehicles the combination of a driving wheel rotated positively from the motor, a driven member loosely mounted on the shaft of said wheel and forming a part of the device for transmitting movement from the said wheel to one of the vehicle wheels, a spring member held by its tension into frictional engagement with the said driving wheel, shoulders on said spring member and said driven member, and coil springs between the shoulders on the spring member on the one side and the shoulders on the driving member on the other side.

6. In transmitting devices for motor driven vehicles the combination of a driving wheel rotated positively from the motor, said wheel having a circular recess therein, a driven member loosely mounted on the shaft of said wheel and forming a part of the device for transmitting movement from the said wheel to one of the vehicle wheels, a spring member held by its tension into frictional engagement with the said driving wheel, said spring member engaging frictionally a circumferential wall of said circular recess, and a yielding coupling between said spring member and the said driven member.

7. In transmitting devices for motor driven vehicles the combination of a driving wheel rotated positively from the motor, a driven member loosely mounted on the shaft of said wheel and forming a part of the device for transmitting movement from the said wheel to one of the vehicle wheels, a spring member held by its tension into frictional engagement with the said driving wheel, said spring member consisting of two parts, the one surrounding the other, coil springs encircling the inner one of said two parts, and shoulders on said spring member and said driven member, the ends of the said coil springs abutting against said shoulders.

In testimony whereof I affix my signature in presence of two witnesses.

EMIL ALFRED JERN.

Witnesses:
AXEL SAHLIN,
GERDA HEDMAN.